(12) United States Patent
Pearson

(10) Patent No.: US 9,118,524 B2
(45) Date of Patent: *Aug. 25, 2015

(54) SOFT PACKET DROPPING DURING DIGITAL AUDIO PACKET-SWITCHED COMMUNICATIONS

(71) Applicant: AT&T INTELLECTUAL PROPERTY I, L.P., Atlanta, GA (US)

(72) Inventor: Gary Whiton Pearson, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/872,346

(22) Filed: Apr. 29, 2013

(65) Prior Publication Data

US 2013/0235723 A1 Sep. 12, 2013

Related U.S. Application Data

(63) Continuation of application No. 12/862,395, filed on Aug. 24, 2010, now Pat. No. 8,451,723, which is a continuation of application No. 10/437,393, filed on May 14, 2003, now Pat. No. 7,813,273.

(51) Int. Cl.
| | | |
|---|---|---|
| H04L 12/56 | (2006.01) | |
| H04L 12/66 | (2006.01) | |
| H04J 3/16 | (2006.01) | |
| H04L 29/06 | (2006.01) | |
| H04L 12/801 | (2013.01) | |
| H04L 12/815 | (2013.01) | |

(Continued)

(52) U.S. Cl.
CPC .... *H04L 29/06176* (2013.01); *H04L 29/06027* (2013.01); *H04L 47/10* (2013.01); *H04L 47/12* (2013.01); *H04L 47/23* (2013.01); *H04L 47/2416* (2013.01); *H04L 47/2433* (2013.01); *H04L 47/32* (2013.01); *H04L 65/00* (2013.01); *H04L 65/602* (2013.01)

(58) Field of Classification Search
None
See application file for complete search history.

(56) References Cited

U.S. PATENT DOCUMENTS

| | | |
|---|---|---|
| 5,130,982 A | 7/1992 | Ash et al. |
| 5,130,985 A | 7/1992 | Kondo et al. |

(Continued)

OTHER PUBLICATIONS

ITU-T Recommendation G.711, General Aspects of Digital Transmission Systems, Terminal Equipments, Pulse Code Modulation of Voice Frequencies (1993).

(Continued)

*Primary Examiner* — Gregory Sefcheck
(74) *Attorney, Agent, or Firm* — Greenblum & Bernstein, P.L.C.

(57) ABSTRACT

A method of packetizing digital information for packet-switched communications includes placing, at a transmitting device with memory and a processor, a most significant bit of a digital voice sample into a variable-length most significant bit packet having a high transmission priority for transmission over a packet-switched network in which a node receives the packet and independently determines how to route the packet. At the transmitting device, a least significant bit of the digital voice sample is placed into a variable-length least significant bit packet having a low transmission priority for transmission over the packet-switched network. Prioritization of packets as having a high transmission priority or low transmission priority is independent of content characteristics of digital voice samples with elements contained therein.

20 Claims, 7 Drawing Sheets

(51) Int. Cl.
*H04L 12/853* (2013.01)
*H04L 12/851* (2013.01)
*H04L 12/823* (2013.01)

(56) References Cited

U.S. PATENT DOCUMENTS

| | | | |
|---|---|---|---|
| 5,222,085 A * | 6/1993 | Newman | 370/422 |
| 5,367,518 A * | 11/1994 | Newman | 370/414 |
| 5,396,491 A * | 3/1995 | Newman | 370/355 |
| 6,104,998 A | 8/2000 | Galand et al. | |
| 6,219,339 B1 | 4/2001 | Doshi et al. | |
| 6,370,163 B1 | 4/2002 | Shaffer et al. | |
| 6,389,038 B1 | 5/2002 | Goldberg et al. | |
| 6,807,595 B2 * | 10/2004 | Khan et al. | 710/260 |
| 6,876,669 B2 | 4/2005 | Shalom | |
| 6,907,001 B1 | 6/2005 | Nakayama et al. | |
| 7,020,141 B1 | 3/2006 | Stacey et al. | |
| 7,206,352 B2 | 4/2007 | Birru et al. | |
| 7,337,112 B2 | 2/2008 | Moriya et al. | |
| 7,813,273 B2 | 10/2010 | Pearson | |
| 2002/0126675 A1 | 9/2002 | Yoshimura et al. | |
| 2002/0136217 A1 | 9/2002 | Christensen | |
| 2002/0181581 A1 | 12/2002 | Birru et al. | |
| 2003/0046064 A1 | 3/2003 | Moriya et al. | |
| 2003/0067922 A1 | 4/2003 | Yoshitani | |
| 2004/0068399 A1 | 4/2004 | Ding | |
| 2011/0019543 A1 | 1/2011 | Pearson | |
| 2012/0020498 A1 | 1/2012 | Fujita et al. | |
| 2012/0140949 A1 | 6/2012 | Chen et al. | |

OTHER PUBLICATIONS

A screen-shot of a website entitled "IEEE Symposium on Computers and Communications (ISCC '95)," downloaded no later than (May 2003).

A screen-shot of a website entitled "The Evolution of IP Routing Using MPLS", downloaded no later than (May 2003).

Le et al., "Efficient and Robust Header Compression for Real-Time Services", IEEE Wireless Communication and Networking Conference, vol. 2, pp. 924-928 (2000).

Thorne, "VoIP—The Access Dimension", BT Technology Journal, vol. 9, No. 2, pp. 33-43 (Apr. 2001).

Gatens, "The Benefit of Low Bit Rate Voice Compression Technologies as Part of a Converged Network Deployment Strategy", Texas Instruments, DSLcon, (2000).

"Making Voice-over-IP Perform as Advertised with QoS", Sitara Network, Inc., downloaded from sitaranetworks.com/products/document_info.cfm? document=11 (1999-2000).

Erskine et al., "Voice Over DSL: Success with BLES", TMCnet.com, downloaded from tmcnet.com/tmcnet/articles/1101vp.htm (Nov. 2001).

"Voice Quality (VQ) in Converging Telephony and Internet Protocol (IP) Networks", IN-IP Word Forum, International Engineering Consortium, downloaded from iec.org/online/tutorials/voice_qual/topic05.html (2002).

"VoIP Bandwidth Utilization and Packet Handling", downloaded from net.com/products/voice_packet/pdf/shout_packet_wp.pdf (2001).

Knight, "Packetizing the Local Loop with Broadband Loop Emulation Services", CTI Network Telephony, downloaded from tmcnet.com/articles/ctimag/0599/0599copper.htm (May 1999).

Casner et al., "Compressing IP/UDP/RTP Headers for Low-Speed Serial Links"; RFC2508, (Feb. 1999).

Degermark et al., "IP Header Compression", RFC2507, (Feb. 1999).

International Telecommunications Union (ITU) telecommunication standard G.711, entitled "Pulse Code Modulation (PCM) of Voice Frequencies", (1993).

"Voice and Multimedia Over ATM—Loop Emulation Service Using AAL2", The ATM Forum Technical Committee, AF-VMOA-0145.000, (Jul. 2000).

"Single-Device Solution Eases VoIP-Over-DSL Deployments", Cisco ISO Software: Beyond Basis IP, vol. 3, Issue 1, downloaded from cisco.com/warp/public/779/servpro/promotions/bbip/volume_03_issue01.html, downloaded no later than (Apr. 2004).

"Guidelines for VoIP Applications", MCK Communications, downloaded from nwextension.com/pdf/VoIP%20Guidelines.pdf, downloaded no later than (Apr. 2004).

"Voice Over Digital Subscriber Line (VoDSL)", Net to Net Technologies, downloaded from nettonet.com/solutions/whitepapers/emea-vodsl.pdf, downloaded no later than (Apr. 2004).

* cited by examiner

SOFT PACKET DROPPING DURING DIGITAL AUDIO PACKET-SWITCHED COMMUNICATIONS

CROSS REFERENCE TO RELATED APPLICATIONS

The present application is a continuation application of pending U.S. application Ser. No. 12/862,395, filed on Aug. 24, 2010, which is a continuation of U.S. application Ser. No. 10/437,393, filed May 14, 2003, now U.S. Pat. No. 7,813,273, issued on Oct. 12, 2010, the contents of which are expressly incorporated by reference herein it their entireties.

BACKGROUND OF THE INVENTION

1. Field of the Invention

The present invention relates to the field of digital communications. More particularly, the present invention relates to digital audio packet-switched communications.

2. Background Information

A need exists to ensure that quality of service (QoS) is maximized in a high-volume packet-switched network. Presently, digital audio information, e.g., a G.711 speech sample, is packetized prior to transmission over a packet-switched network. The digital audio packets represent information of a discrete period of an audio signal. Additionally, other types of digitized audio information, e.g., facsimile or modem data that has been converted from analog to digital format, can be packetized prior to transmission over a packet-switched network.

When a router/switch in the packet-switched network is overburdened during a high-volume peak, the storage capacity of a buffer of the router may be reached. When a storage capacity of a buffer of the router is reached, incoming packets may be "dropped" or discarded without being forwarded to a destination. As a result of dropping packets, digital audio information received at a receiver may be incomplete. For example, notable gaps in packetized voice over internet protocol speech, received over an internet protocol network, may occur.

Previously, each packet of a digital audio communication could be given a high transmission priority for transmission over a packet-switched network. However, when a large amount of communications over the network are of the high-priority communication type, the problem of dropped packets is still encountered during a high-volume period. As a result, the router drops even high-priority packets during a high-volume peak when a large amount of packets transmitted over the network are assigned a high-priority.

Additionally, extra bandwidth could be allocated to ensure high-priority packets are not dropped in a high-volume peak. However, the additional bandwidth may not be needed except during the high-volume peaks. As a result, great cost may be incurred to inefficiently address a problem that occurs only a fraction of the time.

Accordingly, a need exists to reduce the number and percentage of high-priority digital audio packets that are transmitted over a packet-switched network. Additionally, a need exists to prioritize, according to importance, the bits of packetized digital audio samples transmitted over a packet-switched network. Furthermore, a need exists to transmit the most important bits of packetized digital audio samples in packets separate from the least important bits, so that when a high-volume peak occurs in the packet-switched network, the most important bits are still received.

To solve the above-described problems, soft packet dropping during digital audio packet-switched communications is provided to separate bits of digital audio samples into high-priority and low priority packets, so that only the low-priority packets are dropped in a peak-volume period while the high-priority packets are forwarded.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
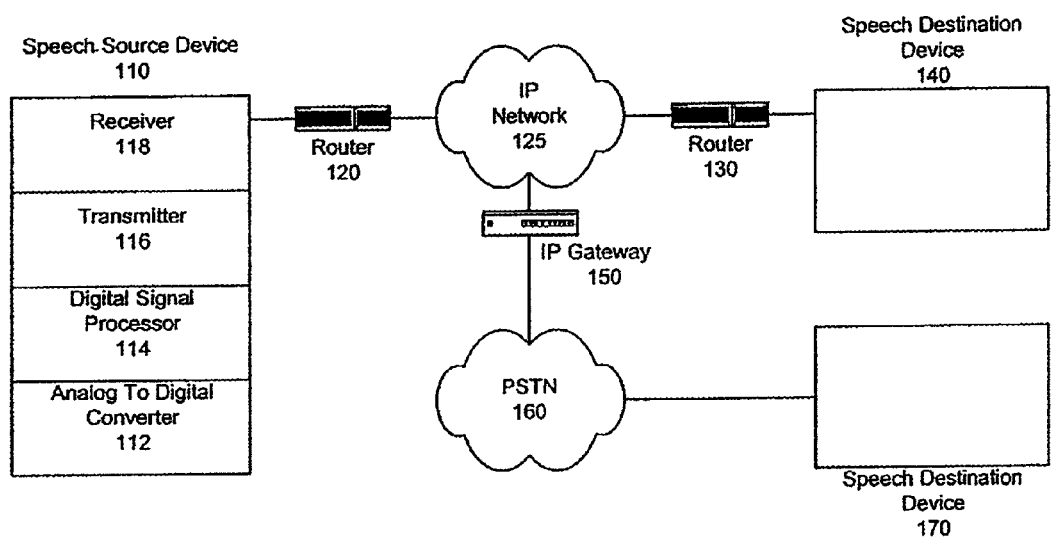
FIG. 1 shows an exemplary network architecture for soft packet dropping during digital audio packet-switched communications, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, a method of packetizing digital audio information for packet-switched communications includes separating a digital audio sample into at least one most significant bit and at least one least significant bit. The most significant bit(s) of the digital audio sample are placed into a most significant bit packet that has a high transmission priority for transmission over a packet-switched network. The least significant bit(s) of the digital audio sample are placed into a least significant bit packet that has a low transmission priority for transmission over a packet-switched network.

According to another aspect of the present invention, the method includes transmitting the most significant bit packet and the least significant bit packet to a router that implements routing prioritization. The router drops the least significant bit packet and forwards the most significant bit packet. According to yet another aspect of the present invention, the digital audio sample is substantially reassembled without the at least one least significant bit of the least significant bit packet. According to still another aspect of the present invention, the least significant bit(s) are represented by replacement bits to reassemble the digital audio sample.

According to a further aspect of the present invention, the method includes transmitting the most significant bit packet and the least significant bit packet to a router that implements routing prioritization. The router forwards the least significant bit packet and the most significant bit packet. According to yet a further aspect of the present invention, the digital audio sample is reassembled with the least significant bit(s) of the least significant bit packet.

According to another aspect of the present invention, the digital audio sample includes an eight bit G.711 speech sample with a sign bit, three exponent bits and four mantissa bits. According to yet another aspect of the present invention, the most significant bits are the sign bit and the three exponent bits, and the least significant bits are the four mantissa bits.

According to an aspect of the present invention, a system that packetizes digital audio information for packet-switched communications includes a transmitting device that separates a digital audio sample into of least one most significant bit and at least one least significant bit. The transmitting device places the most significant bit(s) of the digital audio sample into a most significant bit packet that has a high transmission priority for transmission over a packet-switched network. The transmitting device places the least significant bit(s) of the digital audio sample into a least significant bit packet that has a low transmission priority for transmission over a packet-switched network.

According to another aspect of the present invention, the transmitting device transmits the most significant bit packet to a router that implements routing prioritization. The router drops the least significant bit packet and forwards the most significant bit packet. According to yet another aspect of the present invention, the digital audio sample is substantially reassembled without the least significant bit(s) of the least significant bit packet. According to still another aspect of the present invention, the least significant bit(s) are represented by replacement bits to reassemble the digital audio sample.

According to a further aspect of the present invention, the transmitting device transmits the most significant bit packet to a router that implements routing prioritization. The router forwards the least significant bit packet and the most significant bit packet. According to yet a further aspect of the present invention, the digital audio sample is reassembled with the least significant bit(s) of the least significant bit packet.

According to another aspect of the present invention, the digital audio sample includes an eight bit G.711 speech sample with a sign bit, three exponent bits and four mantissa bits. According to yet another aspect of the present invention, the most significant bits are the sign bit and the three exponent bits, and the least significant bits are the four mantissa bits.

According to an aspect of the present invention, a computer readable medium is provided for storing a computer program that packetizes digital audio information for packet-switched communications. The computer readable medium includes a separating source code segment that separates a digital audio sample into at least one most significant bit and at least one least significant bit. The computer readable medium also includes a most significant bit generating source code segment that places the most significant bit(s) of the digital audio sample into a most significant bit packet that has a high transmission priority for transmission over a packet-switched network. The computer readable medium also includes a least significant bit generating source code segment that places the least significant bit(s) of the digital audio sample into a least significant bit packet that has a low transmission priority for transmission over a packet-switched network.

According to another aspect of the present invention, the computer readable medium includes a transmitting source code segment that transmits the most significant bit packet and the least significant bit packet to a router that implements routing prioritization. The router drops the least significant bit packet and forwards the most significant bit packet. According to yet another aspect of the present invention, the digital audio sample is substantially reassembled without the least significant bit(s) of the least significant bit packet. According to still another aspect of the present invention, the least significant bit(s) are represented by replacement bits to reassemble the digital audio sample.

According to a further aspect of the present invention, the computer readable medium includes a transmitting source code segment that transmits the most significant bit packet and the least significant bit packet to a router that implements routing prioritization. The router forwards the least significant bit packet and the most significant bit packet. According to yet a further aspect of the present invention, the digital audio sample is reassembled with the least significant bit(s) of the least significant bit packet.

According to another aspect of the present invention, the digital audio sample includes an eight bit G.711 speech sample with a sign bit, three exponent bits and four mantissa bits. According to yet another aspect of the present invention, the most significant bits are the sign bit and the three exponent bits, and the least significant bits are the four mantissa bits.

A soft packet dropping method for dropping packets during digital audio packet-switched communications is provided to separate a single digital audio sample into most significant bits for a higher-priority packet and into least significant bits for a lower-priority packet, so that the least significant bits of the lower-priority packets are dropped in a peak-volume period while the most significant bits of the higher-priority packets are forwarded. The method is performed by a system that includes a source device, a destination device and at least one router/switch.

The packets include information (i.e., bits) of a communications sample. The sample can be a digital representation of an analog signal over a discrete time period. The analog signal is continuously sampled and converted into digital samples that are carried by a sequence of packets. For example, an internet protocol packet typically includes audio samples taken over a continuous period from 5 to 50 milliseconds.

As an example, a G.711 encoded digital sample is eight bits including, in order, a sign bit, a three bit exponent and a four bit mantissa. G.711 is a pulse code modulation (PCM) standard of the International Telecommunication Union (ITU). The G.711 standard encompasses μ-law pulse code modulation (PCM) coding and A-law pulse code modulation coding. The most commonly used standard for land lines in, e.g., North America, is μ-law, while A-Law pulse code modulation is the most commonly used standard for land lines in, e.g., Europe.

Both A-law and μ-law PCM coding are used for compressing and expanding digital audio samples. A-law and μ-law pulse code modulation coding map fourteen bit linearly coded digital audio samples to logarithmic coded samples. An additional benefit of A-law and μ-law coding is the reduced amount of bandwidth required to transmit the eight bit samples. The process of generating packets that include sequential digital communications samples is called packetization.

As described above, a packet refers to a set of digital information. The packets may be transmitted over a packet-switched network according to a packet switching protocol. Exemplary packet switching protocols include the transmission control protocol (TCP), the user data protocol (UDP), the internet protocol (IP), the voice over internet protocol (VOIP), and the multiprotocol label switching (MPLS) protocol. The voice over internet protocol includes, for example "Packet Based Multimedia Communications Systems" as defined by the ITU.

Packet switching protocols standardize the format for packet addressing information, routing and processing information so that each node of a packet-switched network that receives a packet can examine the packet information and independently determine how best to continue routing and/or processing the packet. For example, an internet protocol packet includes three priority bits that can be used to prioritize, e.g., the processing of the packet at the nodes of the packet-switched network.

Additionally, the packets of a packet-switching protocol are variable length. The variable length packets can be customized to efficiently use only the amount of bandwidth necessary to transmit the information of the packet. In contrast to a packet transmitted over a packet-switched network, cells transmitted over a "connection-oriented" network, according to a connection-oriented protocol such as asynchronous transfer mode (ATM), are fixed length.

The "connection" between two nodes is typically a reservation of the bandwidth of a "channel" so the connection-oriented node can allocate bandwidth for a cell before the cell is received. Accordingly, a connection-oriented network node will typically not establish a new connection if the node is already operating at full capacity. In contrast, the connectionless network packets are typically received at network nodes without forewarning. As a result, packets in a connectionless network may be dropped at a node if the node is already operating at full capacity, e.g., if a buffer associated with the node is full. Accordingly, a connection-oriented protocol cell is significantly less likely to be dropped in a connection-oriented network than a packet-switched protocol packet is in a connectionless (i.e., packet-switched) network.

FIG. 1 shows an exemplary network architecture for soft packet dropping during digital audio packet-switched communications. The network architecture includes a speech source device 110, a router 120, an IP network 125, a router 130, a speech destination device 140, an IP gateway 150, a public switched telephone network (PSTN) 160, and a speech destination device 170. The speech source device 110 and the speech destination devices 140, 170 may be, for example, a landline telephone, a wireless telephone, a wireless application protocol (WAP) cellular phone, a personal digital assistant (PDA), a personal computer (PC), a handheld computer, a desktop computer, a laptop computer, a notebook computer, a mini computer, a workstation, a mainframe computer, a set top box for a television, a web-enabled television, a mobile web browser, a cable modem, a DSL modem, a wireless modem, a wireless LAN modem, or any other type of device that permits access to the communications network.

The communications network may be a network or combination of networks, including wireline networks, wireless networks, or a combination of wireline and wireless networks. The network(s) include the internet or another network for packet-switched transmission.

A connectionless (packet-switched) network does not establish virtual connections or allocate bandwidth for fixed-length packets as is done for connection-oriented networks. The information of the packet switching protocol packets may be transmitted over one or more connection-oriented links. The information of the packet switching protocol packets may be translated for transmission using the connection-oriented protocol so that the information can be transmitted across the connection-oriented network links. Accordingly, when packet information is translated into fixed-length connection-oriented protocol cells, e.g., ATM cells, the packet switching protocol packet information may be transparently (i.e., blindly) transported across the connection-oriented network links as it was received, i.e., without regard to whether the bits of the digital audio samples have been separated.

Accordingly, as used herein, the terms "network" and "networks" refer to any packet-switched network or combination of networks that include at least one packet-switched network, and that interconnect multiple source and destination devices and/or provide a medium for transmitting packetized information from one device to another. Additionally, as used herein, the terms "packet" or "packets" refer to any packet switching protocol packets that are transmitted over a network, as defined above, from a source to a destination.

At the speech source device 110, an analog to digital converter 112 codes a sample of an analog audio signal into a digital audio sample. The digital audio sample has multiple bits. In the example of the G.711 eight bit sample, the four most significant bits are used as a sign and an exponent. However, the four least significant bits also carry information of the original audio sample. Therefore, increased levels of coding accuracy (i.e., lower quantization noise) can be obtained from each of the four least significant mantissa bits. In this regard, using, e.g., the two most significant mantissa bits (i.e., the fifth and sixth bits) will not provide the same level of accuracy and distinctiveness as providing all four mantissa bits (i.e., the fifth-eighth bits).

The speech source device 110 also includes a digital signal processor 114. The digital signal processor 114 separates the audio sample into high order bits and low order bits. In the alternative, another processor, e.g., firmware, may be used to implement an algorithm to separate bits of the audio sample. The high order bits are sequentially entered into a high order bit packet. The low order bits are sequentially entered into a low order bit packet. The packets may include bits of multiple digital audio samples. When the packets are, e.g., full, the packets are transmitted to the router. Of course, the packets have headers with information used for routing such as the packet priority, the packet source, the destination, and/or the packet sequence number.

The speech source device 110 also has a transmitter 116 and a receiver 118. The transmitter 116 transmits the packets according to the packet header information. The transmitter 116 may be associated with one or more buffers that are used to store packets during transmission, in some cases until receipt of the packet is confirmed by a destination device. The receiver 118 receives packets from a destination device.

The router 120 receives the packets from the speech source device 110. The router 120 has at least two buffers. A buffer may be separately provided for each priority level of communications. If a high order buffer of the router 120 has space available to enter the high order bit packet, then the high order bit packet is entered into the high order buffer. Additionally, if a low order buffer of the router 120 has space available to enter the low order bit packet, then the low order bit packet is entered into the low order buffer. However, time-sensitive information, e.g., a VOIP packet, is not useful if significant processing delays occur. Thus, if either buffer is full, the corresponding packet is dropped and discarded. The router processes packets from the high order buffer at a higher rate than a low order buffer. However, the packets in each buffer are processed on a first in-first out (FIFO) basis.

The router 120 retrieves packets from the respective buffers and forwards them according to the information in the packet header. In the example of FIG. 1, the packets are forwarded to the router 130 via the IP network 125. The router 130 processes the packets in a manner similar to the processing at the router 120. The router 130 processes the packets from the respective buffers and forwards them according to the information in the packet headers.

The packets are forwarded to the speech destination device 140. The speech destination device 140 includes hardware and software similar to the speech source device, e.g., a digital to analog converter, a digital signal processor, a transmitter and a receiver (not shown). The speech destination device 140 receives the packets and processes the packets in parallel. The high order bit packet includes the separated high order bits of a series of digital audio samples. The low order bit packet includes the separated low order bits of a series of digital audio samples. The speech destination device 140 reconstructs the complete digital audio samples by aligning and combining the high order bits and the low order bits. The reconstructed digital audio samples are decoded by a speech decoder at the speech destination device 140 and converted to an analog signal by the digital to analog converter. Accordingly, the analog speech is reconstructed at the speech destination device 140.

In another embodiment, the speech source device 110 and the speech destination device 140 are replaced with, e.g., facsimile machines or modems (not shown). The high order bit packet and the low order bit packet may be, e.g., multiprotocol label switching packets. Accordingly, MPLS high order bit packets and MPLS low order bit packets can be used to transmit digital information, e.g., facsimile data and/or modem data. In other words, the present invention may be applied to packet-switched networks that use digital data that can be separated into most significant bits and least significant bits.

Additionally, the communications network may include gateways to send, receive or utilize content using the communications network. The network gateway may be any intermediate communications apparatus used to process requests to transfer content to and from user devices. The network gateway may be a node of the communications network used to interface with additional communications networks. In the embodiment shown in FIG. 1, the packets may be forwarded from the IP network 125 to the IP gateway 150 when the information in the packet headers indicates that the destination is a communication device connected to the PSTN 160. The IP gateway 150 receives the packets and converts the digital information into a format compatible with the PSTN 160, e.g., ATM.

In another embodiment, a gateway determines that the PSTN 160 can carry the digital information in the same format in which it is received. Accordingly, the gateway does not convert the digital information when the conversion is unnecessary.

The IP gateway 150 may include a processor, e.g., a digital signal processor, that reconstructs μ-law and A-law PCM samples using the higher priority and lower priority packets. The samples are then transmitted through the PSTN 160 to the speech destination device 170. The speech destination device 170 converts the digital samples to analog signals using, e.g., a digital to analog converter. A similar process may be used, in reverse, to forward digital audio samples from the speech destination device 170 to the speech source device 110 using the PSTN 160, the IP gateway 150 and the IP network 125.

Figure 2:
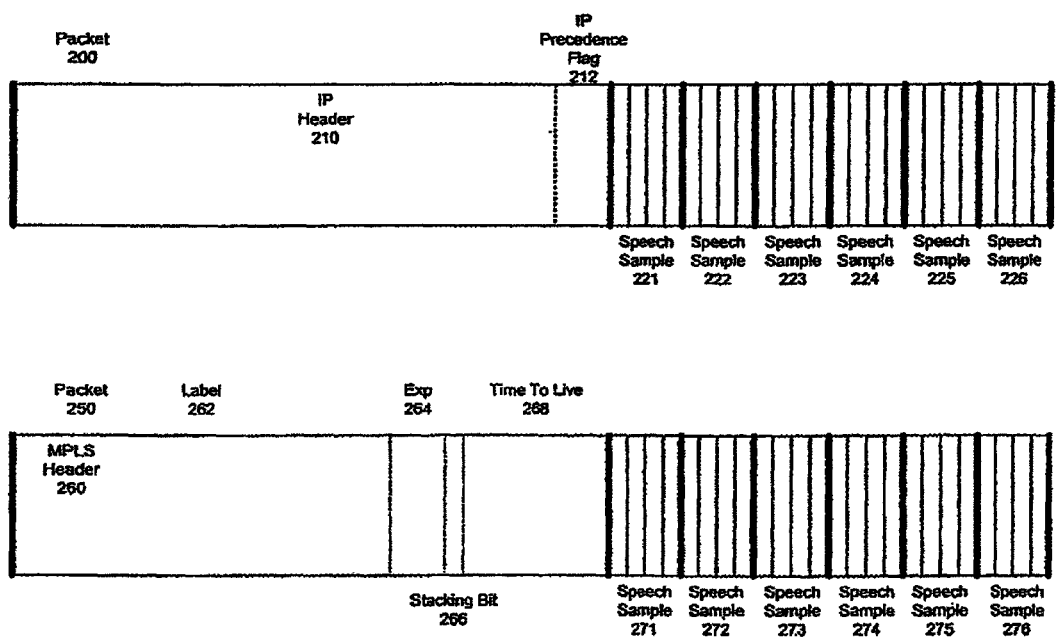
FIG. 2 shows exemplary internet protocol and multiprotocol label switched packets used to transmit digitized information, according to an aspect of the present invention.

FIG. 2 shows exemplary packets used to carry communications samples according to the present invention. The packets may carry, for example, bits of a digital audio sample for voice over internet protocol communications. In another embodiment, the packets can be used to carry digital information that can be separated into most significant bits and least significant bits. For example, the packets can be used to carry modem or facsimile data. The first packet 200 is an internet protocol packet that includes an IP header 210. The IP header 210 includes an IP precedence flag 212 with three bits. Using the IP precedence flag 212, the packet 200 can conceivably be assigned any of eight separate priorities, i.e., 000, 001, 010, 011, 100, 101, 110 and 111. A higher priority internet protocol packet 200 will be stored in a buffer that is queried more frequently than a buffer for lower priority (e.g., priority 000) internet priority packets 200. As used herein, the terms "higher" and "lower" are used to indicate priority levels of the packets and buffers relative to each other. Additionally, an internet protocol higher priority (e.g., priority 001) packet 200 may be stored in a large buffer that can store more internet protocol packets 200 than a buffer for lower priority internet protocol packets 200. Accordingly, higher priority internet protocol packets 200 are less likely to be dropped than lower priority internet protocol packets 200.

The first packet 200 includes bits of six digital speech samples 221-226 coded, for example, using G.711. A digital speech sample includes, in order, a sign bit, a three bit exponent and a four bit mantissa. The information of the speech samples 221-226 includes only the four most significant bits, e.g., the sign bit and the three bit exponent, or only the four least significant bits, e.g., the four bit mantissa. Accordingly, an eight bit digital speech sample is divided into most significant bits and least significant bits. When the most significant bits of multiple sequential digital speech samples are carried in an internet protocol packet 200, the least significant bits of the same multiple sequential digital speech samples are carried in another internet protocol packet 200.

The second packet 250 is a multiprotocol label switching packet. In the second packet 250, a multiprotocol label switching (MPLS) header 260 is used. The MPLS header 260 includes a label 262 with twenty bits, an experimental queue and discard prioritization section 264 with three bits, a stacking bit 266 and a time to live section 268 with eight bits. The three bit experimental queue and discard prioritization section 264 of the packet 250 can be used in a manner analogous to the IP precedence flag 212 of the IP header 210 in the packet 200. Accordingly, the three bit experimental queue and discard prioritization section 264 can be used to set a higher priority for an MPLS most significant bit packet than is set for an MPLS least significant bit packet. The second packet 250 also includes bits of six digital speech samples 271-276 coded using, for example, G.711. The information of the speech samples 271-276 includes only the four most significant bits, e.g., the sign bit and the three bit exponent, or the four least significant bits, e.g., the four bit mantissa. Accordingly, when the most significant bits of multiple sequential digital speech samples 271-276 are carried in the MPLS packet 250, the least significant bits of the same multiple sequential digital speech samples are carried in another MPLS packet 250.

In another embodiment, the multiprotocol packet switching packet 250 is used to carry data of, for example, a facsimile machine. The MPLS packet 250 can be used to carry many types of information. Accordingly, as long as the most significant bits of information can be separated from the least significant bits, the information can be separately transmitted using multiple MPLS packets 250 that are assigned different priorities.

The headers 210, 260 also include information indicating the sequence in which packets 200, 250 are to be processed by a receiver. For example, a series of voice over internet protocol packets 200 or MPLS packets 250 that each include bits of sequential digital speech samples may have headers marked with sequence numbering. The sequence information is used at a destination to determine a processing order for a series of internet protocol packets 200 or MPLS packets 250. Accordingly, the speech samples 221-226, 271-276 in the packets 200, 250 are decoded into analog speech signals in a proper order at a receiver even when the packets are not received in a proper order.

The headers 210, 260 include additional information used to process the packet. A router 120, 130 that receives the packets 200, 250 will process the packets 200, 250 based, at least in part, on the priority indicated by the precedence flag 212 or the experimental queue and discard prioritization section 264. The router 120, 130 includes buffers for each priority level. Upon reception at the router 120, 130, the packets 200, 250 are entered into a buffer if the buffer is not filled to capacity. The router 120, 130 retrieves the packets 200, 250 from the buffer, analyzes the header 210, 260 information, and forwards the packets 200, 250 to a destination. A router 120, 130 normally retrieves the packets 200, 250 from a buffer in a first in-first out sequence.

The router 120, 130 will query a higher priority buffer more often than a lower priority buffer. As an example, if a router 120, 130 has buffers for only two priorities, higher and lower, the router 120, 130 may query the higher priority buffer 75% of the time and the lower priority buffer 25% of the time. If a buffer for packet 200, 250 is filled to capacity, the packet 200, 250 is "dropped" or discarded. Of course, there may be different or additional priorities assigned in a packet-switched network. The exemplary priorities "higher" and "lower" used herein describe an exemplary relative relationship between different priorities assigned to two packets or two buffers.

Figure 3:
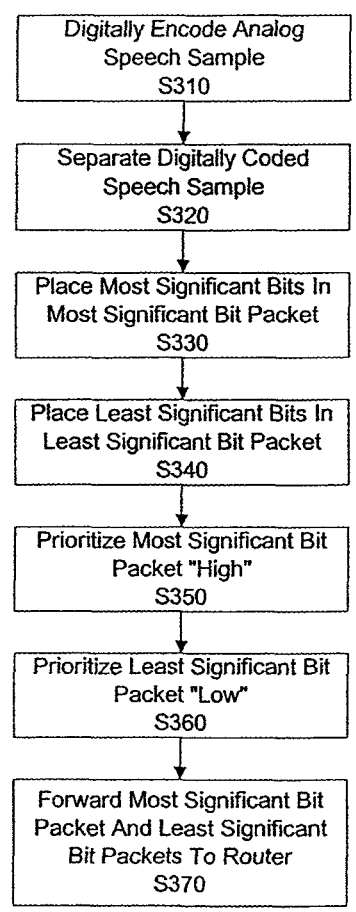
FIG. 3 is a flow diagram showing an exemplary method of forwarding packets of digitally coded speech samples, according to an aspect of the present invention.

FIG. 3 is a flow diagram showing an exemplary method of forwarding packets of a digitally coded speech sample. At S310, an analog speech sample is digitally encoded by the analog to digital converter 112. At S320, the digitally coded speech sample is separated into most significant bits and least significant bits by the digital signal processor 114. In the example of a G.711 speech sample, the bits can be separated into four most significant bits and four least significant bits. However, the digital speech samples can also be separated into five most significant bits and three least significant bits, six most significant bits and two least significant bits, or seven most significant bits and one least significant bit. In other words, a tradeoff can be made to ensure a greater level of accuracy at traffic peaks by placing more bits of each speech sample into most significant bit packets. Of course, fewer than four bits of each sample can also be placed into the most significant bit packets. When an equal number of bits are not placed in each packet from a sample, either the packets are not of a uniform size, or the speech time frame of the digital audio sample information in a most significant bit packet does not perfectly match the speech time frame of the digital audio sample information in a least significant bit packet. The imperfectly matched packets can be realigned and processed in parallel at the speech destination device so that the least significant bits and the most significant bits of each speech sample are reassembled properly.

At S330, the most significant bits are placed in the most significant bit packet by the digital signal processor 114. At S340, the least significant bits are placed in the least significant bit packet by the digital signal processor 114. At S350, the most significant bit packet is prioritized "higher" and, at S360, the least significant bit packet is prioritized as "lower". At S370, the most significant bit packet and the least significant bit packets are forwarded to the router 120 by the transmitter 116 of the speech source device 110.

Figure 4:
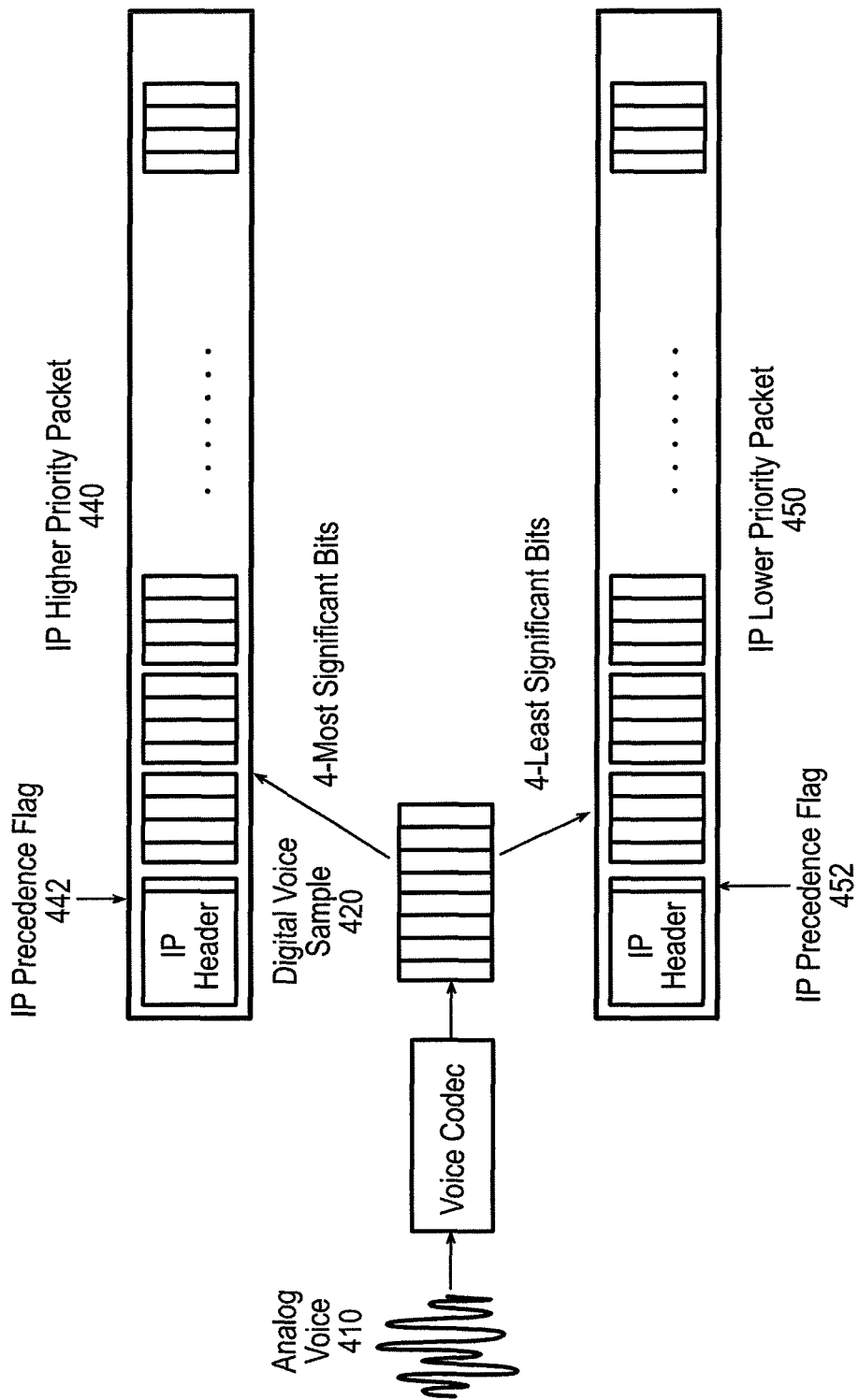
FIG. 4 shows an example of separating speech sample bits into different packets with different priorities, according to an aspect of the present invention.

FIG. 4 shows an example of separating speech samples into different packets with different priorities, according to an aspect of the present invention. An analog voice sample 410 is received by a voice coder/decoder (codec) of a speech source device 110. The voice coder/decoder converts the analog voice sample 410 into a digital voice sample 420. The digital voice sample 420 may be, for example, an eight bit G.711 voice sample.

The bits of the digital voice sample 420 are separated into most significant bits and least significant bits. The most significant bits are placed into an IP higher priority packet 440. The IP higher priority packet 440 has an IP header with an IP precedence flag 442. Additionally, the least significant bits are placed into an IP lower priority packet 450. The IP lower priority packet 450 has an IP header with an IP precedence flag 452.

The IP higher priority packet 440 and the IP lower priority packet 450 are forwarded from the speech source device 110 to the speech destination device 140, 170. If a lower priority buffer of a router 120, 130 along the communication path has no space available, the IP lower priority packet 450 is dropped and, therefore, is not received by the speech destination device 140, 170. However, the IP higher priority packet 440 with the high priority bits is received by the speech destination device 140, 170. The high priority bits are used to reassemble the digital voice samples 420. Accordingly, the most significant parts of the digital voice sample 420 can be simulated using the most significant bits to approximate the original analog speech sample upon conversion at the speech destination device 140, 170.

The low priority bits that are dropped with the IP lower priority packet 450, are replaced when the digital voice samples 420 are reassembled. The method used to replace the low priority bits depends on the specific pulse code modulation technique being used. For μ-law pulse code modulation, the low priority bits are replaced with "1111", i.e., four one bits. However, for A-law pulse code modulation, the low priority bits are replaced with "0000", i.e., four zero bits, consistent with A-law even bit inversion, as specified in ITU specification G.711.

Additionally, if, for any reason, the most significant bit packets are dropped and the least significant bit packets are received at a receiver, then the entire sample may be treated as if no bits were received. In the case where both most significant bit packets and least significant bit packets are dropped, missing samples are replaced with eight one bits according to the μ-law standard. Additionally, missing samples are replaced with eight zeroes according to the A-law pulse code modulation standard. As with the case when only the least significant bit packets are dropped, the even zero bits are then inverted according to the A-law pulse code modulation standard.

Of course, dropped or missing bits can be replaced with zero or near-zero amplitude values according to any pulse code modulation standard. For example, the dropped or missing bits may not be replaced with four ones or four zeroes. Accordingly, if a pulse code modulation standard does not require replacing dropped packets of the lowest priority bits with all ones or all zeroes, then the bits may be replaced in a manner chosen by the receiver's designer.

Figure 5:
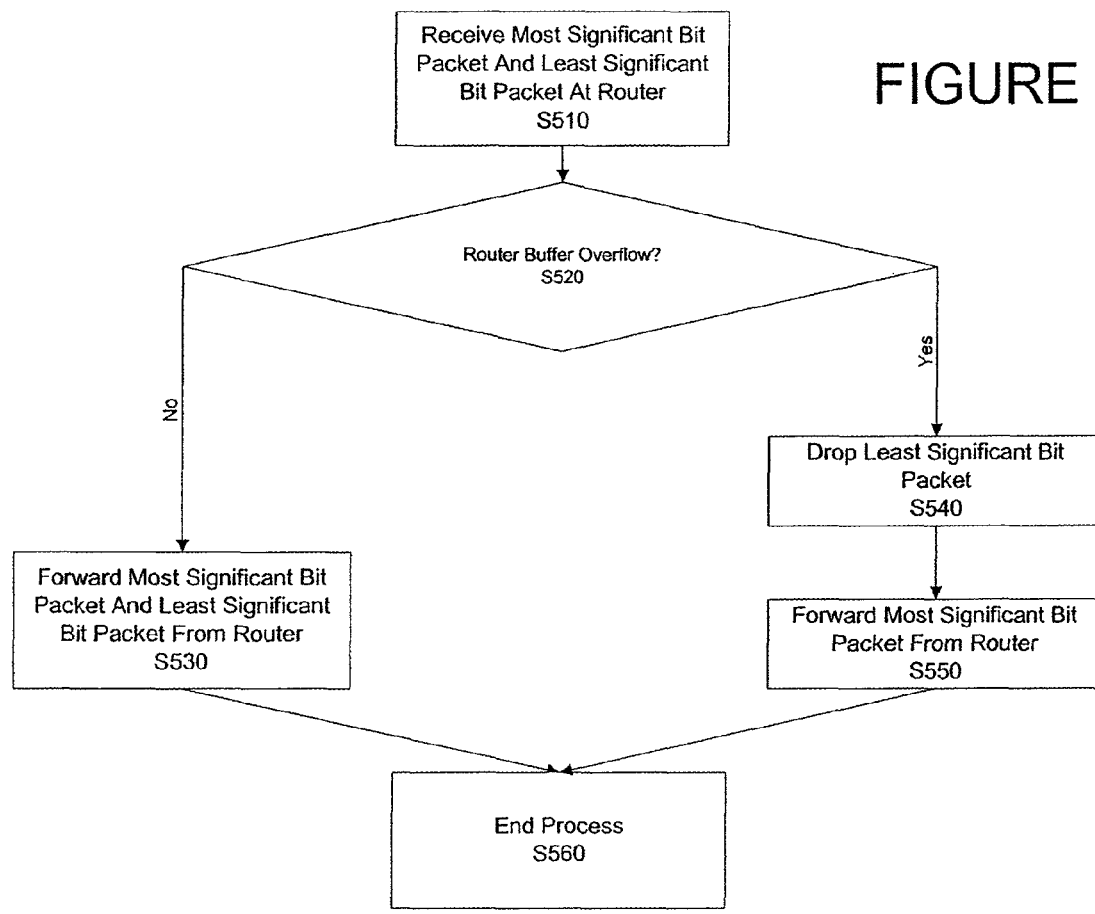
FIG. 5 is a flow diagram showing an exemplary method of dropping a packet of digitally coded speech sample bits, according to an aspect of the present invention.

FIG. 5 is a flow diagram showing an exemplary method of dropping an packet of a digitally coded speech sample. At S510, a most significant bit packet 440 and a least significant bit packet 450 are received at a router 120. A determination is made at S520 whether a lower priority buffer of the router is full (overflowing). If the lower priority buffer of the router is not full, the least significant bit packet is temporarily stored in the lower priority buffer and then forwarded, with the most significant bit packet, along the communications path to the router 130.

If the lower priority buffer is full at S520 (S520=Yes), the least significant bit packet is dropped at S540. When the least significant bit packet is dropped, only the most significant bit packet is forwarded from the router 120 at S550. After the packet(s) are forwarded at S530 or at S550, the process at the router 120 ends at S560.

Accordingly, when a lower priority buffer of the router 120 is full, the least significant bit packet 450 is dropped. The most significant bit packet 440 is still forwarded so that the most significant components of the speech samples carried by the packets 440, 450 are still received by the speech destination device 140, 170. The speech destination device 140, 170 is then able to convert the most significant bits of the speech samples into analog speech for the recipient.

As an example, if an audio signal is converted into one hundred sixty digital speech samples 420 by the coder/decoder of the speech source device 110, then one hundred sixty bytes are generated. If the one hundred sixty speech samples were carried by two sequential internet protocol packets 200 that each have headers 210 of approximately twenty bytes, then the total number of bytes to be transmitted in the two internet protocol packets is approximately three hundred sixty. However, if a router buffer for one of the internet protocol packets is full when the internet protocol packets are received, the internet protocol packets are dropped and a silent interlude results at the speech destination device 140. However, using the method of the present invention, if the two internet protocol packets separately carry the most significant bits and the least significant bits of the one hundred sixty speech samples, and if the internet protocol least significant bit packet is assigned a lower transmission priority, then the internet protocol least significant bit packet is dropped and the internet protocol most significant bit packet will be carried. As a result, instead of a silent interlude, the most significant portion of each speech sample will be reproduced at the speech destination device 140. Thus, without the requirement of additional bandwidth, the speech is substantially reproduced without silent periods in the example.

Figure 6:
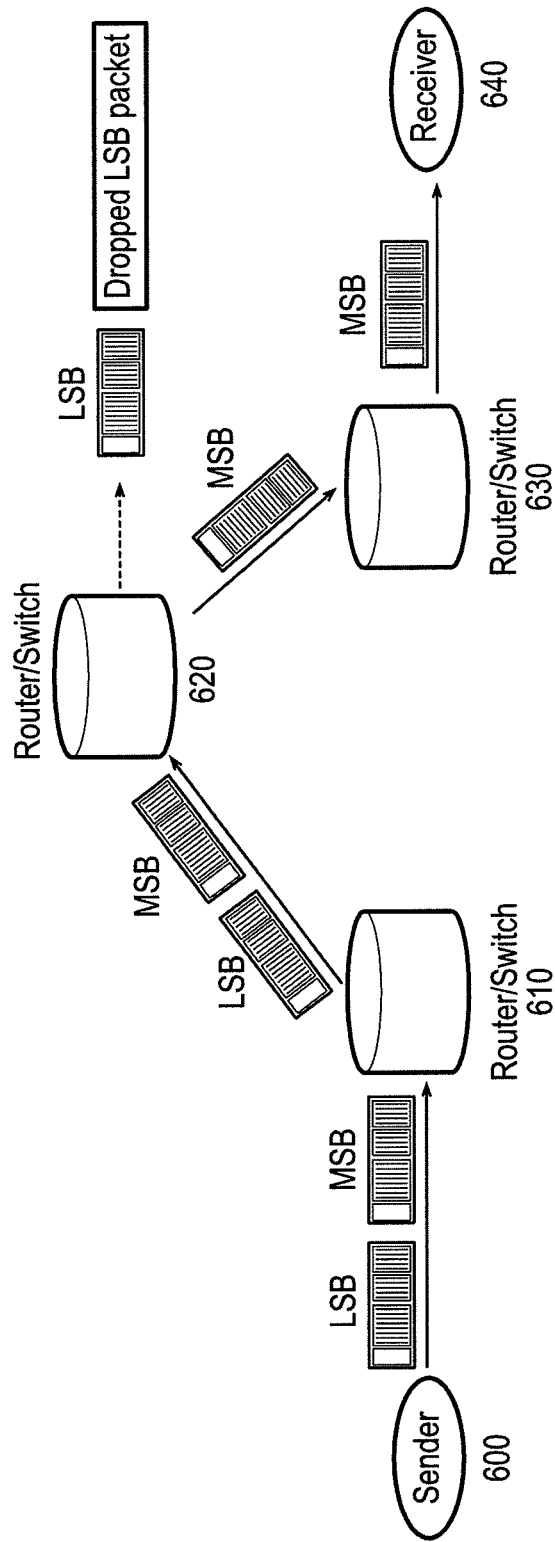
FIG. 6 shows another exemplary network architecture for soft packet dropping during digital audio packet-switched communications, according to an aspect of the present invention.

FIG. 6 is another exemplary network architecture for soft packet dropping during digital audio packet-switched communications. The exemplary network architecture includes a sender 600, a router/switch 610, a router switch 620, a router switch 630 and a receiver 640.

The sender 600 generates a speech pattern that is converted into, e.g., a voice over internet protocol most significant bit (MSB) packet and a voice over internet protocol least significant bit (LSB) packet. The voice over internet protocol most significant bit packet and the voice over internet protocol least significant bit packet are forwarded to the router/switch 610, which forwards the voice over internet protocol packets to the router/switch 620. The router switch 620 has a low priority bit buffer that is overflowing, so the voice over internet protocol least significant bit packet is dropped. The voice over internet protocol most significant bit packet is forwarded to the router/switch 630, which forwards the voice over internet protocol most significant bit packet to the receiver 640. At the receiver 640, the most significant bits of each speech sample carried in the voice over internet protocol most significant bit packet are reassembled into digital speech samples. The least significant bits are filled with values in the reassembled digital speech samples. Accordingly, the digital speech samples are reassembled based on the most significant bits and the replacement values of the least significant bits, and converted into analog speech. Using the most significant bits of the digital speech samples, the original speech of the sender is substantially reproduced.

Figure 7:
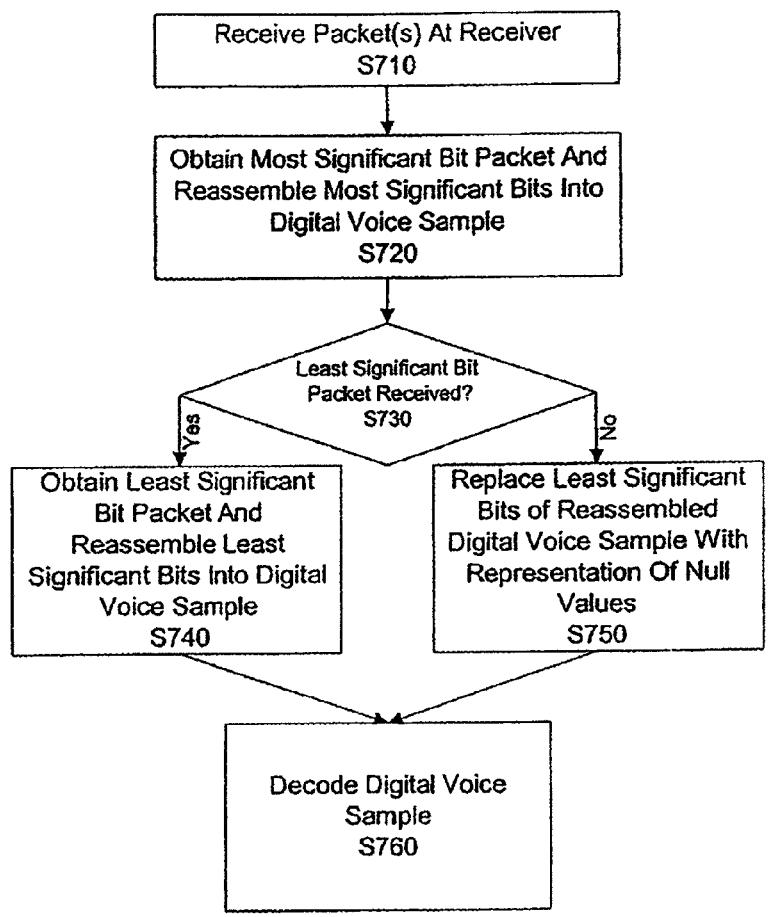
FIG. 7 is a flow diagram showing an exemplary method of reassembling a digitally coded speech sample, according to an aspect of the present invention.

FIG. 7 is an exemplary flow diagram showing a method of reassembling a digitally coded speech sample. At S710, the packets are received at a receiver. At S720, the most significant bit packet is obtained and the most significant bits are reassembled into digital voice samples. At S730, a determination is made whether a least significant bit packet is received. If the least significant bit packet is received at S730 (S730=Yes), the least significant bit packet is obtained and the least significant bits are reassembled into the digital voice samples at S740. However, if the least significant bit packet is not received at S730 (S730=No), then the least significant bit positions of the reassembled digital voice samples are replaced with replacement values at S750. After the digital voice samples are reassembled at S740 or S750, the digital voice samples are decoded at S760.

Accordingly, the most significant portions of digital audio samples can be processed so that an original signal can be substantially reproduced using the most significant portions of the original digital audio sample.

Additionally, the method described herein need not produce an increased bandwidth requirement, even when none of the packets are dropped. For example, if 1000 speech samples that would otherwise be fully packetized into two sequential packets are instead packetized into two packets of parallel information, then substantially the same amount of bandwidth is required. However, only the packet of the most significant bits is accorded the higher transmission priority according to the method described herein. As a result, a burden on a router is reduced so that less digital information is assigned a higher transmission priority.

For µ-law PCM coded voice signals, the estimated signal to noise ratio (SNR) improvement from the method described herein is 12 dB. Previously, a dropped packet that resulted in a silent gap produced a signal to noise ratio of 0 dB because the noise power and the signal power are the same (i.e., no signal is present). Accordingly, approximately a 12 dB improvement in signal to noise ratio is achieved according to the present invention even when a least significant bit packet is dropped. Of course, a speech sample reassembled with both least significant bits and most significant bits has an estimated signal to noise ratio of 28 dB. Accordingly, in a case where no packets are dropped as a result of a lower percentage of higher-priority packets, the improvement in signal to noise ratio during some periods that is attributable to the invention described herein may be as high as approximately 28 dB.

Accordingly, even if no fewer packet switching protocol packets are dropped as a result of the present invention, the most important components of digital audio samples are still received at a receiving device. As a result, silences and gaps are reduced in communications using the soft packet dropping method. As is explained, the least significant bits are only dropped during a peak volume period at a router. However, the soft packet dropping method allows a router to distinguish between the most important packets of a communication and the least important packets of the communication. Therefore, according to the invention described above with respect to FIGS. 1-7, the original digital audio samples can be substantially reconstructed with fewer gaps or silent periods while, at the same time, fewer of the packet switching protocol packets are assigned a higher transmission priority in communications.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For example, the processes shown in FIG. 3 may occur in a different order, e.g., the least significant bits may be placed in a least significant bit packet before the most significant bits are placed in a most significant bit packet.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described. Furthermore, alternative software implementations including, but not limited to, distributed processing or component/object distributed processing, parallel processing, or virtual machine processing can also be constructed to implement the methods described.

It should also be noted that the software implementations of the present invention as described are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards, protocols and languages for pulse code modulation (e.g., G.711, µ-law, A-law) and packet-switched communications (TCP, UDP, IP, VOIP, MPLS) represent examples of the state of the art. Such standards are periodically superseded by faster or more efficient equivalents having essentially the same functions. Accordingly, replacement standards and protocols having the same functions are considered equivalents.

The invention claimed is:

1. A method of packetizing digital information for packet-switched communications, comprising:
   placing, at a transmitting device with memory and a processor, a most significant bit of a digital voice sample into a variable-length most significant bit packet having a high transmission priority for transmission over a packet-switched network in which a node receives the packet and independently determines how to route the packet, and
   placing, at the transmitting device, a least significant bit of the digital voice sample into a variable-length least significant bit packet having a low transmission priority for transmission over the packet-switched network,
   wherein prioritization of packets as having a high transmission priority or low transmission priority is independent of content characteristics of digital voice samples with elements contained therein.

2. The method of claim 1, further comprising:
   transmitting the most significant bit packet and the least significant bit packet to a router that implements routing prioritization, the router dropping the least significant bit packet and forwarding the most significant bit packet.

3. The method of claim 2,
   wherein the digital voice sample is substantially reassembled without the least significant bit of the least significant bit packet.

4. The method of claim 3,
   wherein the least significant bit is represented by replacement bits to reassemble the digital voice sample.

5. The method of claim 1, further comprising:
   transmitting the most significant bit packet and the least significant bit packet to a router that implements routing prioritization, the router forwarding the least significant bit packet and the most significant bit packet.

6. The method of claim 1,
   wherein the transmitting device is a mobile device.

7. The method of claim 1,
   wherein the priority of each of the most significant bit packet and the least significant bit packet is indicated by three priority bits.

8. A system that packetizes digital information for packet-switched communications, comprising:
   a transmitting device with memory and a processor that places a most significant bit of a digital voice sample into a variable-length most significant bit packet having a high transmission priority for transmission over a packet-switched network in which a node receives the packet and independently determines how to route the packet, and that places a least significant bit of the digital voice sample into a variable-length least significant bit packet having a low transmission priority for transmission over the packet-switched network,
   wherein prioritization of packets as having a high transmission priority or low transmission priority is independent of content characteristics of digital voice samples with elements contained therein.

9. The system of claim 8,
   wherein the transmitting device further transmits the most significant bit packet to a router that implements routing prioritization, the router dropping the least significant bit packet and forwarding the most significant bit packet.

10. The system of claim 9,
    wherein the digital voice sample is substantially reassembled without the least significant bit of the least significant bit packet.

11. The system of claim 10,
    wherein the least significant bit is represented by replacement bits to reassemble the digital voice sample.

12. The system of claim 8,
    wherein the transmitting device further transmits the most significant bit packet to a router that implements routing prioritization, the router forwarding the least significant bit packet and the most significant bit packet.

13. The system of claim 8,
    wherein the priority of each of the most significant bit packet and the least significant bit packet is indicated by three priority bits.

14. The system of claim 8,
    wherein the transmitting device comprises a mobile device.

15. The system of claim 14,
    wherein the most significant bit is the sign bit and the three exponent bits, and the least significant bit is the four mantissa bits.

16. A non-transitory computer readable medium that stores a computer program for packetizing digital information for packet-switched communications, the computer program, when executed by a processor, causing a computer to perform acts comprising:
- placing, at a transmitting device with a memory and a processor, a most significant bit of a digital voice sample into a variable-length most significant bit packet having a high transmission priority for transmission over a network in which a node receives the packet and independently determines how to route the packet;
- placing, at the transmitting device, a least significant bit of the digital voice sample into a variable-length least significant bit packet having a low transmission priority for transmission over the packet-switched network,
- wherein prioritization of packets as having a high transmission priority or low transmission priority is independent of content characteristics of digital voice samples with elements contained therein.

17. The non-transitory computer readable medium of claim 16,
- wherein the digital voice sample is substantially reassembled without the least significant bit of the least significant bit packet.

18. The non-transitory computer readable medium of claim 16,
- wherein the least significant bit is represented by replacement bits to reassemble the digital voice sample.

19. The non-transitory computer readable medium of claim 16,
- wherein the priority of each of the most significant bit packet and the least significant bit packet is indicated by three priority bits.

20. The non-transitory computer readable medium of claim 16,
- wherein the transmitting device comprises a mobile device.

* * * * *